United States Patent

Kawagoe et al.

Patent Number: 6,134,491
Date of Patent: Oct. 17, 2000

[54] STEERING CONTROL SYSTEM FOR VEHICLE

[75] Inventors: Hiroyuki Kawagoe; Shinnosuke Ishida; Tomoaki Teramoto; Kaoru Matsuno, all of Wako, Japan

[73] Assignee: Honda Giken Kogyo Kabushiki Kaisha, Tokyo, Japan

[21] Appl. No.: 09/151,759

[22] Filed: Sep. 11, 1998

[30] Foreign Application Priority Data

Sep. 13, 1997 [JP] Japan .................................... 9-268050

[51] Int. Cl.⁷ .................................................. A01B 69/00
[52] U.S. Cl. .............................. 701/43; 701/80; 180/410; 180/421
[58] Field of Search .................................. 701/41, 43, 80; 180/402, 404, 407, 421, 422, 78, 400, 410

[56] References Cited

U.S. PATENT DOCUMENTS

| | | | |
|---|---|---|---|
| 4,782,907 | 11/1988 | Morishita et al. | 180/412 |
| 5,652,487 | 7/1997 | Nishino et al. | 180/446 |
| 6,018,691 | 1/2000 | Yamamoto et al. | 701/41 |

Primary Examiner—William A. Cuchlinski, Jr.
Assistant Examiner—Gertrude Arthur
Attorney, Agent, or Firm—Arent Fox Kintner Plotkin & Kahn, PLLC

[57] ABSTRACT

A system for controlling steering of a vehicle, including a steering unit having an electric motor which steers driven wheels of the vehicle, a first steering control unit (EPS ECU 76) for controlling the actuator, a CCD camera for detecting a condition of a lane on a road on which the vehicle travels, a steering assist torque determining unit for determining a steering assist torque necessary for holding a positional relationship between the vehicle and the lane condition, a torque sensor for detecting a steering torque manually applied to the steering unit by the driver, second steering control unit for calculating a torque command to be output to the first steering control unit based on the steering assist torque calculated by the steering assist torque calculating unit and the detected steering torque to control the motor such that the torque command decreases. In the system, a failure detecting unit is provided for detecting whether a failure has occurred at least in determination of the steering assist torque, and the control by the second control unit is discontinued, or is switched to the control by the first control unit when the failure is detected, thereby enabling to detect or discriminate the occurrence of failure with accuracy and to take a necessary countermeasure to cope with the failures condition.

29 Claims, 8 Drawing Sheets

STEERING CONTROL SYSTEM FOR VEHICLE

BACKGROUND OF THE INVENTION

1. Field of the Invention

This invention relates to a steering control system for a vehicle.

2. Description of the Related Art

Earlier patent applications proposed by the assignee, including those made public by Japanese Laid-Open Patent Application Nos. Hei 5(1993)-197,423 and Hei 9(1997)-221,054, teach vehicle steering control system technologies that provide steering angle assistance for keeping the vehicle on a desired course of travel along a lane of a road.

By providing fine steering assistance while preventing vehicle lane wandering, these technologies greatly reduce the burden on the driver, which tends to increase particularly during long, high-speed driving on an expressway or the like.

In view of the interference or interaction between this type of steering assistance control and driver steering, the control should preferably be effected to provide assistance through torque (steering force) rather than steering angle.

Aside from the above, it is desirable to detect or discriminate whether a failure has occurred in such a torque assist system with accuracy and take an appropriate countermeasure to cope with the failure condition.

SUMMARY OF THE INVENTION

An object of this invention is therefore to provide a steering control system for a vehicle that can detect or discriminate the occurrence of failure with accuracy and take a necessary countermeasure to cope with the failure condition.

Moreover, when the system is thus configured to conduct fine steering assistance control to prevent vehicle lane wandering, it is desirable to detect or discriminate a failure or fault in determining a steering assist torque necessary for a desired lane holding torque assistance control and take any countermeasure to cope with the failure condition.

Another object of this invention is therefore to provide a steering control system for a vehicle that can detect or discriminate a failure or fault in determining a steering assist torque necessary for a desired lane holding torque assistance control and take any countermeasure to cope with the failure condition.

In order to achieve this object, there is provided a system for controlling steering of a vehicle, including: steering means having an actuator which steers driven wheels of the vehicle; first steering control means for controlling the actuator; first detecting means for detecting a condition of a lane on a road on which the vehicle travels; second detecting means for detecting motion of the vehicle; steering assist torque determining means for determining a steering assist torque necessary for holding a positional relationship between the vehicle and the lane condition; torque detecting means for detecting a steering torque manually applied to the steering means by the driver; second steering control means for calculating a torque command to be output to the first steering control means based on the steering assist torque calculated by the steering assist torque calculating means and the detected steering torque to control the actuator such that the torque command decreases; failure detecting means for detecting whether a failure has occurred at least in determination of the steering assist torque; and control discontinuing means for discontinuing the control by the second control means when the failure is detected.

BRIEF EXPLANATION OF THE DRAWINGS

This and other objects and advantages of the invention will be more apparent from the following description and drawings, in which.

DETAILED DESCRIPTION OF THE PREFERRED EMBODIMENTS

An embodiment of the invention will now be explained with reference to the attached drawings.

Figure 1:
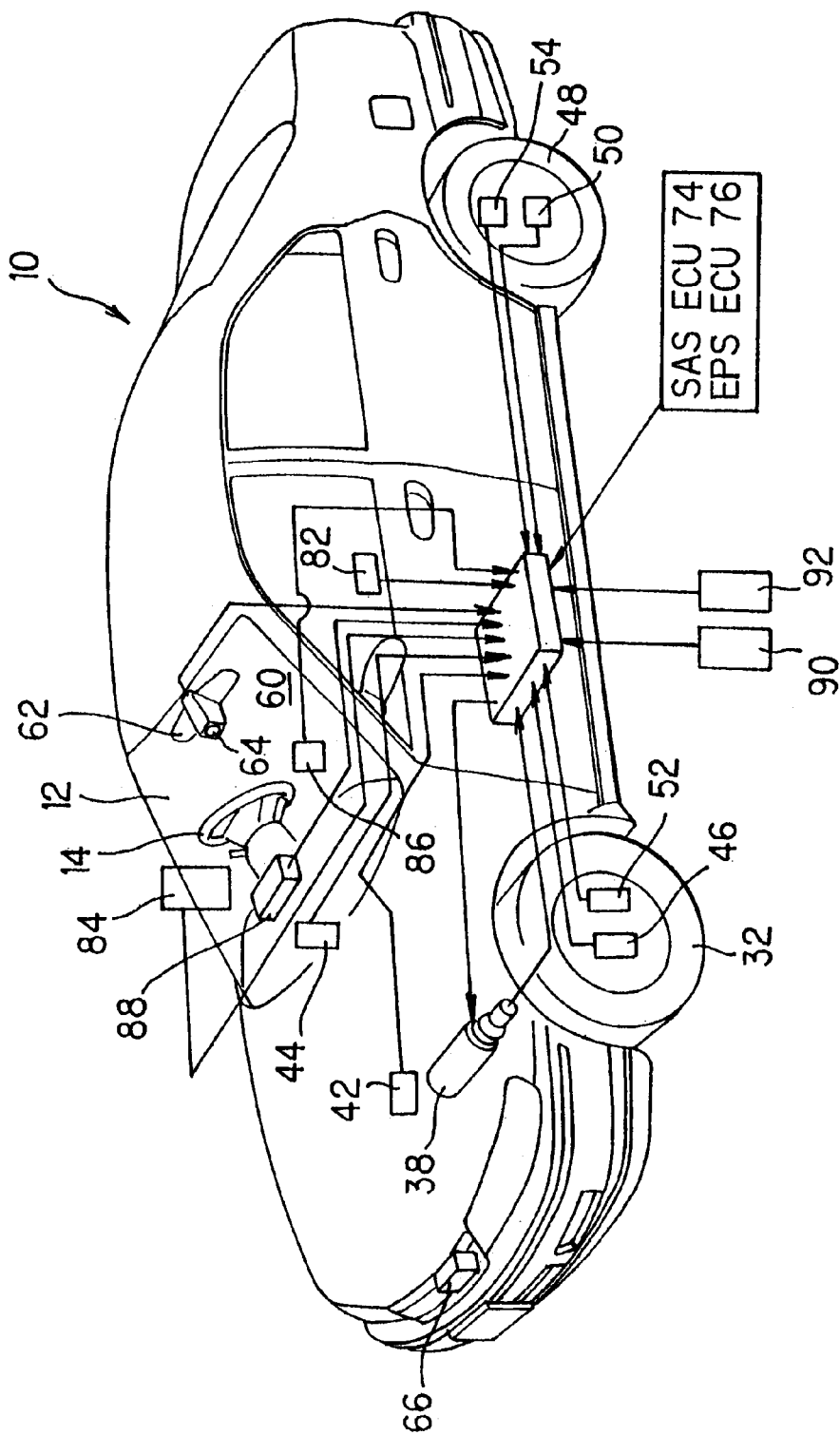
FIG. 1 is a schematic view showing the overall configuration of a vehicle steering control system according to the present invention.
Figure 2:
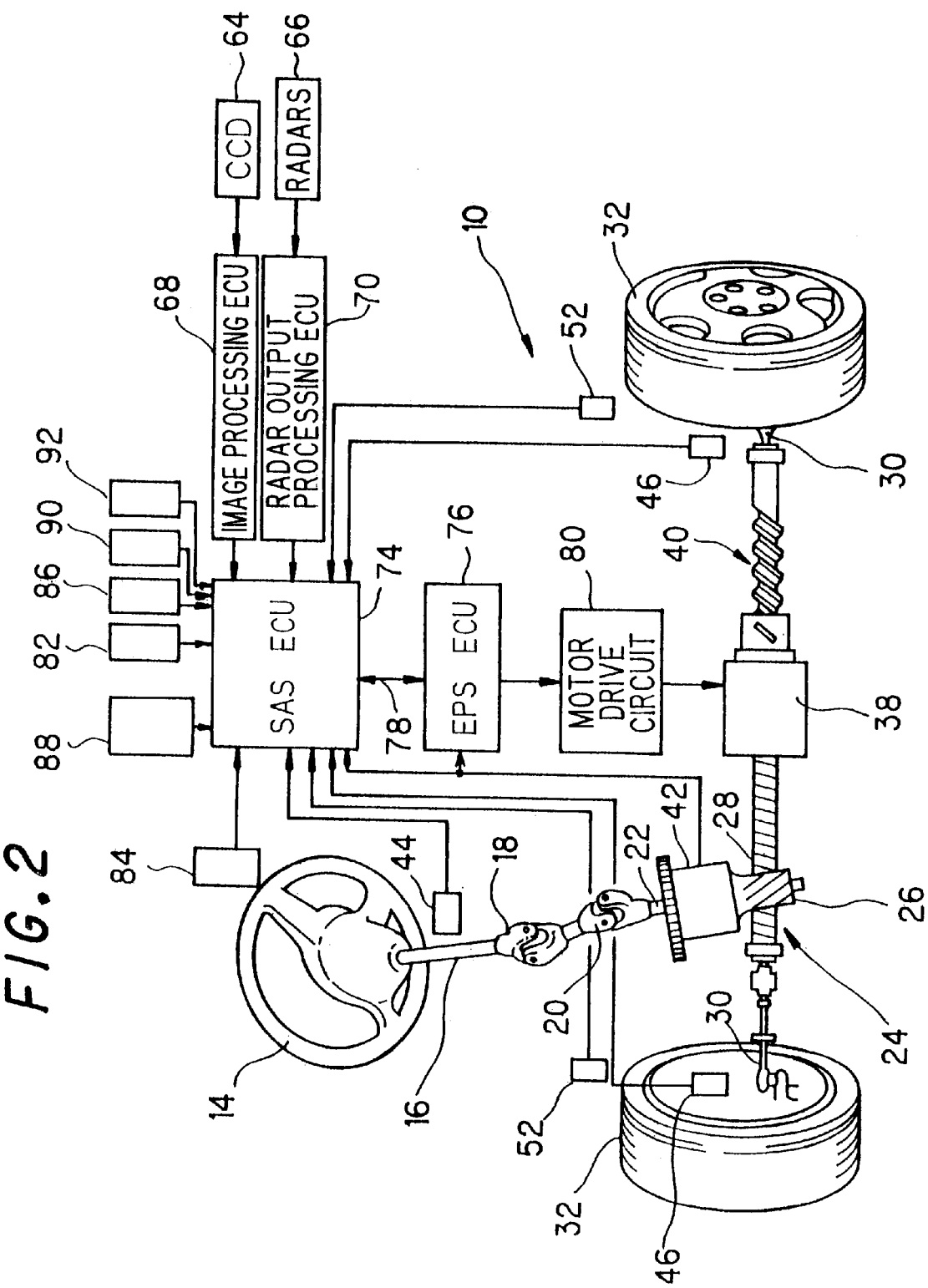
FIG. 2 is an explanatory view showing the configuration of a steering mechanism illustrated in FIG. 1.

FIG. 1 is an overall schematic view of a vehicle steering control system according to the invention. FIG. 2 is an explanatory view of the system with particular focus on the steering mechanism.

As shown in FIGS. 1 and 2, a steering wheel 14 located at the driver's seat 12 of a vehicle 10 is connected to a steering shaft 16 that is in turn connected through universal joints 18, 20 to a connecting shaft 22.

The connecting shaft 22 is connected to a pinion 26 of a rack-and-pinion steering gear assembly 24. The pinion 26 is engaged with a rack 28. Rotary motion input from the steering wheel 14 passes through the pinion 26 to be converted into linear motion of the rack 28. The linear motion passes through tie rods (steering rods) 30, 30 at the opposite ends of the front axle to turn two front wheels (steered wheels) 32, 32 in the desired direction around the associated king pins (not shown).

An electric motor 38 and a ball-screw mechanism 40 are disposed coaxially with the rack 28. The output of the motor 38 is converted into linear motion of the rack 28 by a ball-screw mechanism 40 so as to move the rack 28 in the direction that reduces or assists the steering force (steering torque) input through the steering wheel 14.

A torque sensor 42 provided in the vicinity of the rack-and-pinion steering gear 24 outputs a signal indicating the direction and magnitude of the steering force (steering torque) input by the driver. A steering angle sensor 44 provided in the vicinity of the steering shaft 16 outputs a signal indicating the direction and magnitude of the steering angle θ input by the driver. The steering angle sensor 44 is a rotary encoder or the like.

Wheel speed sensors 46, 46 provided one in the vicinity of each of the front wheels 32, 32 and wheel speed sensors 50, 50 (FIG. 1; only one shown) provided one in the vicinity of each of two rear wheels 48, 48 (only one shown) output signals once every rotation of the associated front and rear wheels. The wheel speed sensors 46, 46 and 50, 50 are magnetic pick-ups or the like. The front wheels 32, 32 are powered by an engine (not shown) mounted at the front of the vehicle 10. The rear wheels 48, 48 are idle.

A vehicle height sensor 52 is provided in the vicinity of the suspension mechanism (not shown) of each front wheel 32 and a vehicle height sensor 54 is provided in the vicinity of the suspension mechanism (not shown) of each rear wheel 48. Based on the stroke (displacement) of the associated suspension mechanism, each height sensor outputs a signal indicating the height of the vehicle 10 at the sensor location.

As shown in FIG. 1, a single CCD (charge coupled device) camera 64 combined with rear-view mirror 62 is attached to the inner surface of the windshield 60 above the driver's seat 12. Multiple radars 66 (operative in millimeter wave; only one radar shown in FIG. 1) are provided at appropriate locations near the front bumper of the vehicle 10 and emit modulated waves to the front.

The CCD camera 64 is dedicated to imaging the road ahead of the vehicle. As shown in FIG. 2, the image signal output by the CCD camera 64 is forwarded to an image processing ECU (electronic control unit) 68, comprised of a microcomputer, that extracts the lane boundaries (white lines) painted on the road. The outputs of the millimeter wave radars 66 are forwarded to a radar output processing ECU 70, also comprised of a microcomputer, where they are mixed with a received wave obtained through an antenna (not shown) and used to discriminate whether or not a solid object such as other vehicle locates ahead of the vehicle 10.

The vehicle steering control system according to the invention also has an electronic control unit (shown as SAS ECU) 74, also comprised of a microcomputer. The outputs of the image processing ECU 68, the radar output processing ECU 70 and the torque sensor 42 etc. are input to the SAS ECU 74.

The system is also equipped with a second electronic control unit (shown as EPS ECU) 76 comprised of a microcomputer. The EPS ECU 76 computes the power steering torque assist amount. The output of the torque sensor 42 is input to the EPS ECU 76.

The SAS ECU 74 and the EPS ECU 76 can communicate with each other through a signal line 78. The SAS ECU 74 computes the steering torque assist amount as explained later and forwards the computed data to the EPS ECU 76.

The EPS ECU 76 uses the steering torque assist amount data received from the SAS ECU 74 to compute a command value in duty ratio in terms of PWM (pulse-width modulation) and outputs it to a motor drive circuit 80.

Figure 3:
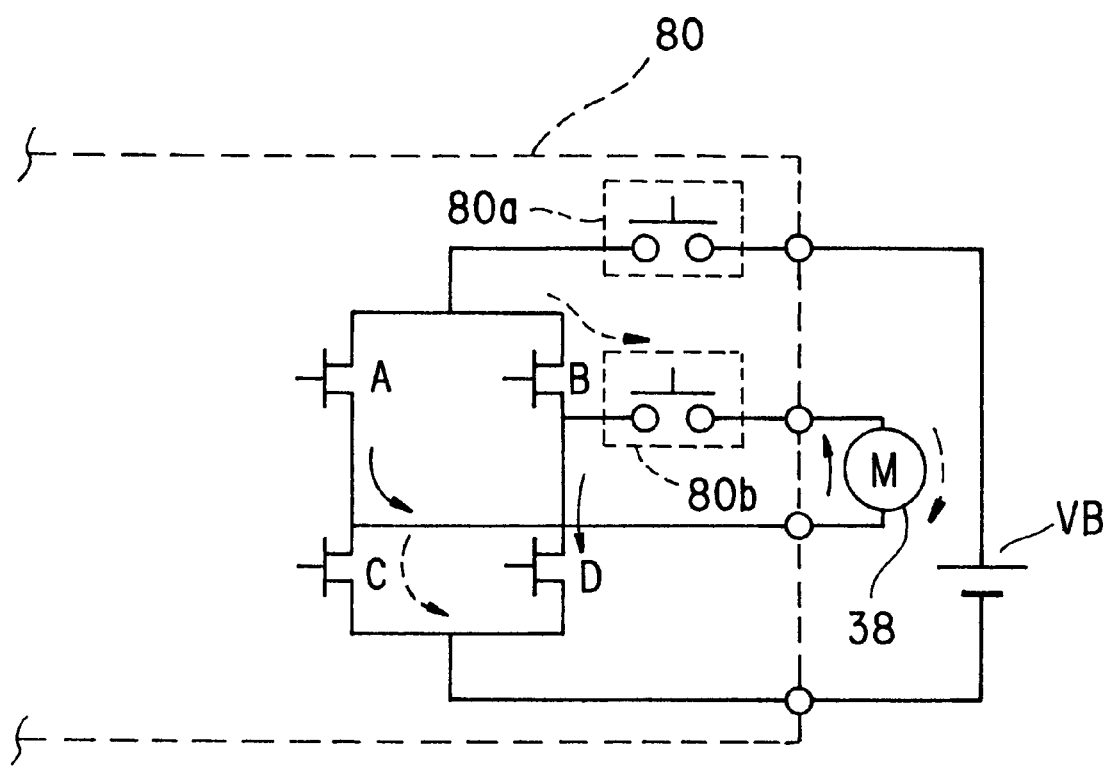
FIG. 3 is a circuit diagram showing the configuration of a motor drive circuit illustrated in FIG. 2.

FIG. 3 is a circuit diagram showing the configuration of the motor drive circuit 80.

As illustrated, the motor drive circuit 80 is composed of a bridge circuit composed of four power FET switching devices (transistors) A, B, C, D. When the FET switching devices A, D are turned on to flow source current as shown by arrows (solid lines), the electric motor 38 rotates in the direction shown by an arrow (solid line). On the other hand, when the other FET switching devices B, C are turned on to flow source current as shown by arrows (broken lines), the electric motor 38 rotates in the opposite direction as shown by an arrow (broken lines).

The EPS ECU 76 calculates the motor current command and supplies the current command to the FET switching devices in drive pulse trains having variable duty ratio to control the electric motor 38. A PW relay 80a is provided between the power source (battery voltage) VB and the bridge circuit. Another relay (F/S relay 80b) is provided between the source of the FET switching device B and the electric motor 38.

Returning to the explanation of FIG. 1, a yaw rate sensor 82 (FIG. 1) is installed at a location near the center of gravity of the vehicle 10. The yaw rate sensor 82 outputs a signal indicating the yaw rate (angular velocity of yaw) around the vertical (gravitational) axis at the vehicle center of gravity.

An appropriate number of tactile pressure sensors 84 provided on the steering wheel 14 output pressure signals indicating whether or not the driver is manipulating the steering wheel. An appropriate number of second tactile pressure sensors 86 installed under the driver's seat output signals indicating whether or not the driver is seated.

A navigator 88 provided in the area of the dashboard is equipped with a memory device storing road information (map information) regarding the region where the vehicle 10 travels.

A brake sensor 90 associated with the brake pedal (not shown) near the floor at the driver's seat 12 outputs a signal indicating the amount of depression of the brake pedal by the driver. An accelerator sensor 92 associated with the accelerator pedal (not shown) outputs a signal indicating the amount of depression of the accelerator pedal by the driver.

An overall explanation of the control by the SAS ECU 74 and the EPS ECU 76 will now be given.

Figure 4:
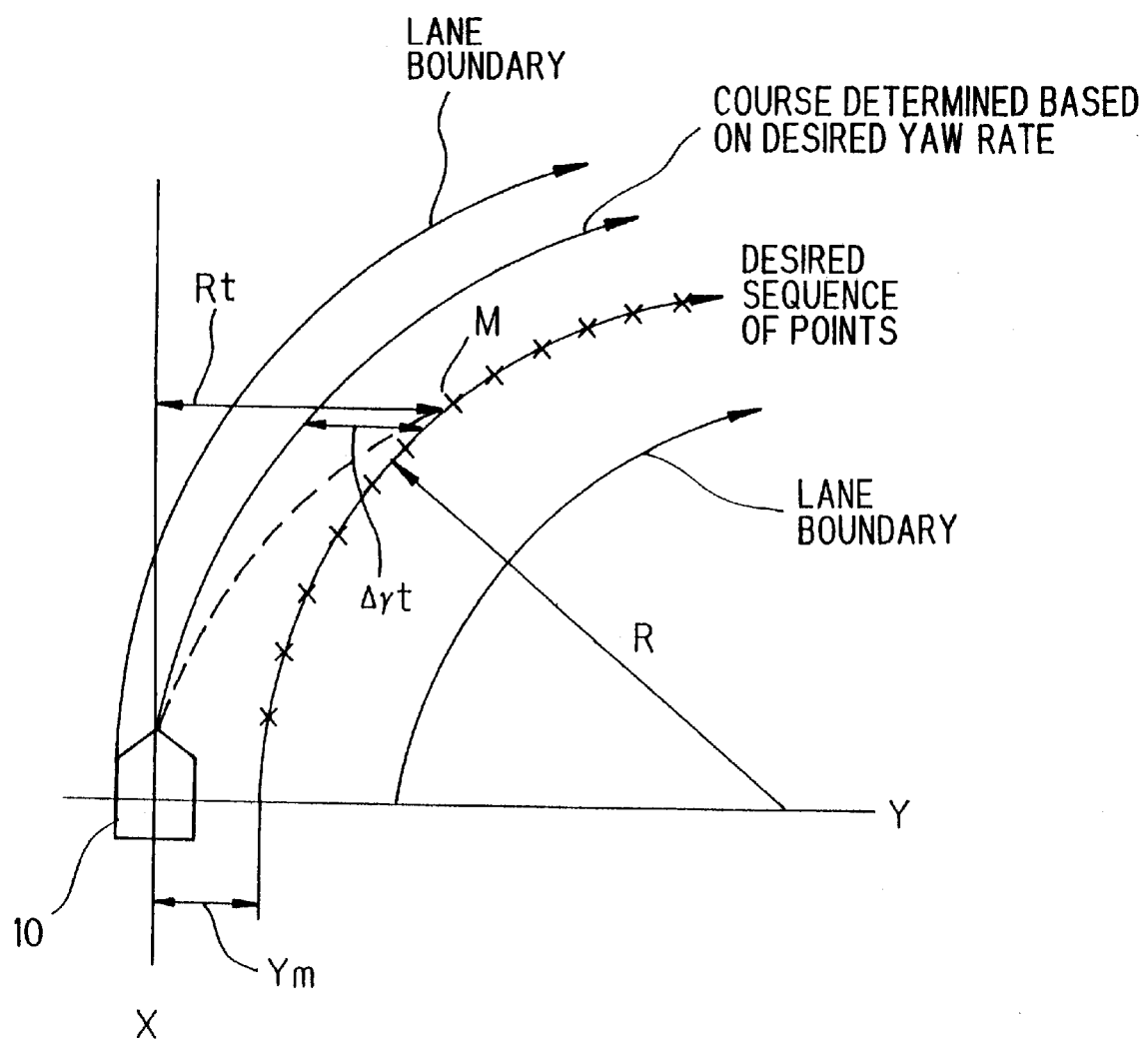
FIG. 4 is an explanatory view showing the operation of an SAS ECU illustrated in FIG. 2.

The SAS ECU 74 determines or computes the lane holding steering assist torque for keeping the vehicle 10 traveling parallel with the lane (lane boundaries). Although this computation is conducted by a separate routine not shown in the drawings, the principle will be briefly explained with reference to FIG. 4. A desired sequence of points is calculated from the lane boundaries obtained by image processing the output of the CCD camera 64 in the image processing ECU 68. A desired yaw rate is calculated from the desired sequence of points.

Figure 5:
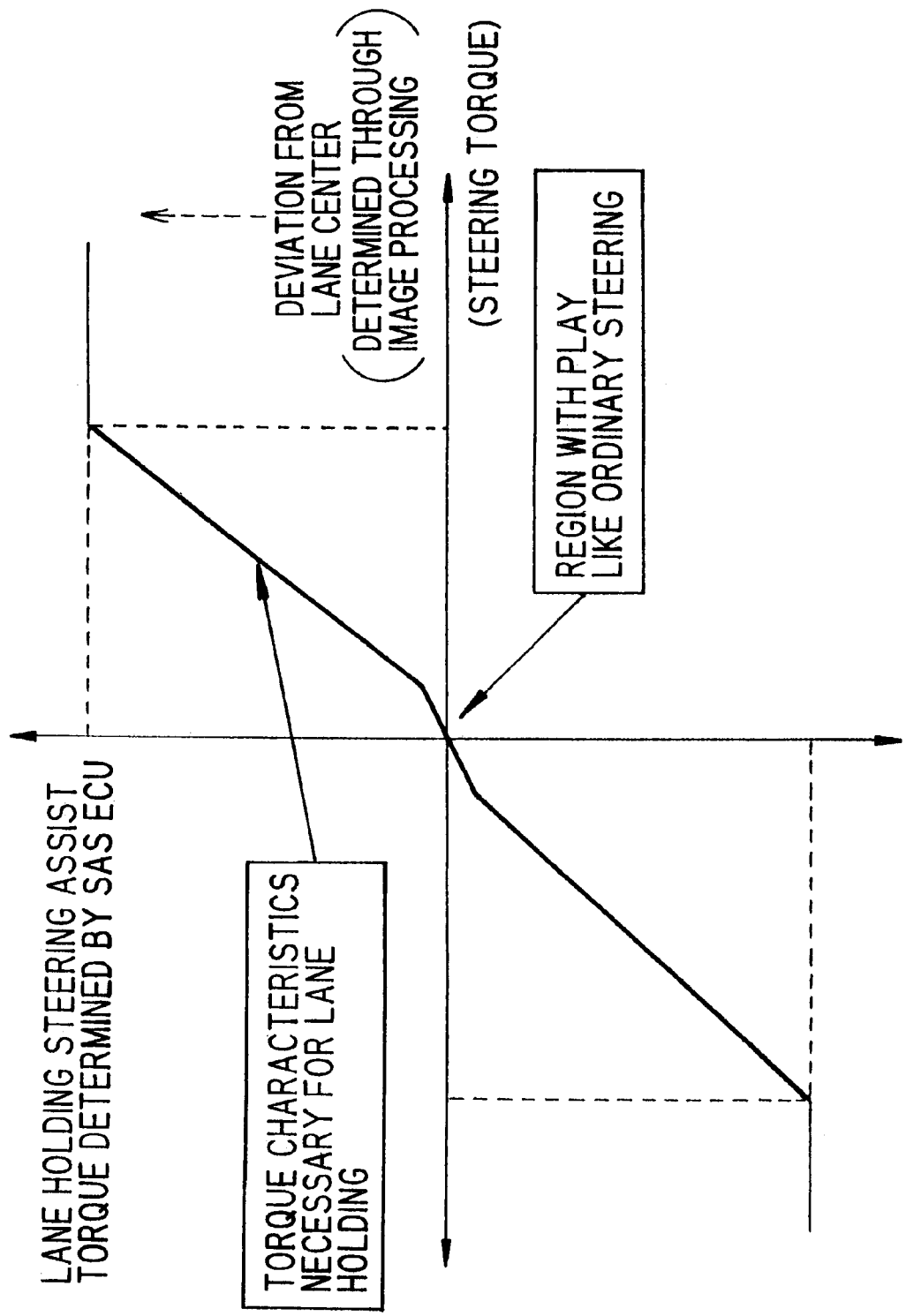
FIG. 5 is a graph showing the characteristics of steering assist torque determined by the SAS ECU and an EPS ECU illustrated in FIG. 2.

As shown in FIG. 5, the lane holding steering assist torque is calculated in accordance with deviation from the lane center and control is effected to achieve a course determined based on the desired yaw rate. As indicated parenthetically in FIG. 5, the EPS ECU 76 uses the detected steering torque to determine or compute a power steering assist torque.

Figure 6:
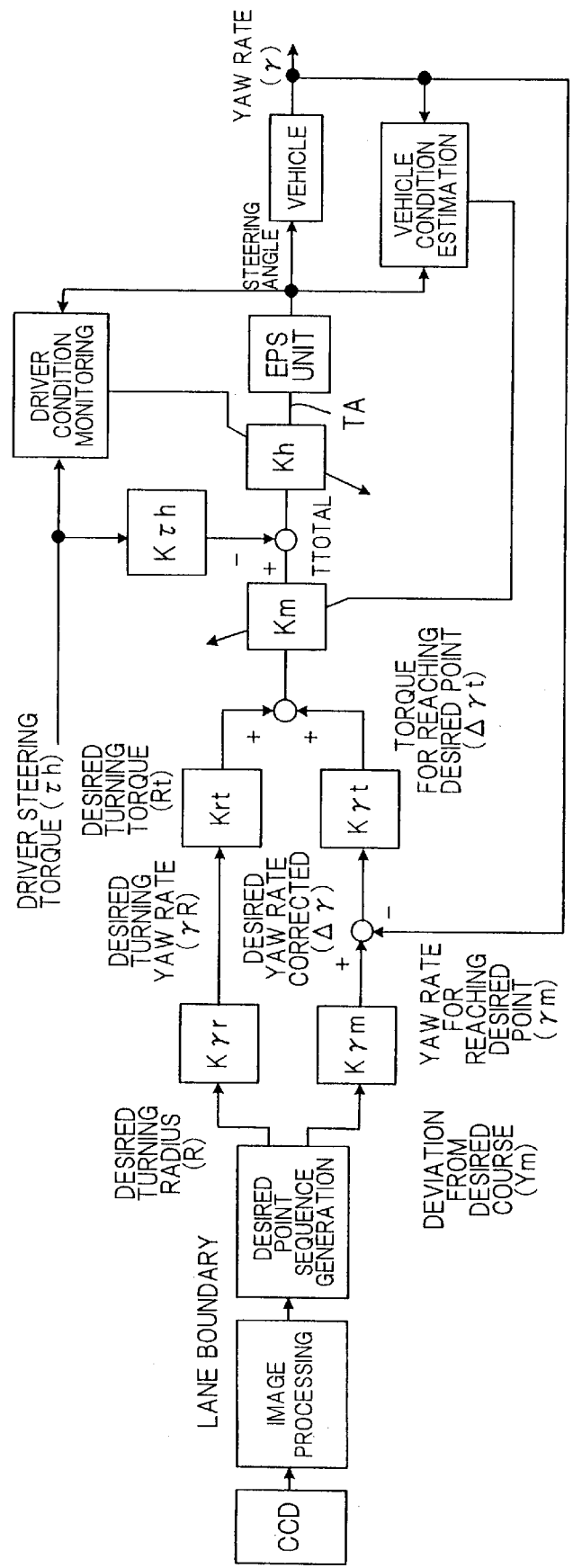
FIG. 6 is a block diagram showing functionally the operation of the SAS ECU illustrated in FIG. 2.

FIG. 6 is a block diagram showing this control. As illustrated, a torque command TA is determined from the lane holding steering assist torque and the conventional power steering assist torque.

The basic steering assistance control of this system is that carried out by the SAS ECU 74 for holding the vehicle in the lane, and the system switches to the steering assistance control by the EPS ECU 76 when the steering torque input by the driver exceeds a prescribed value (explained later).

Since this control is described in detail in a Japanese patent application filed by the assignee on the same date, it will not be explained further here.

The invention relates to the detection or discrimination of whether a failure has occurred in the SAS ECU 74. This failure detection will now be explained with reference to the flow chart shown in FIG. 7.

In the flow chart, the procedures in S100 to S102 are conducted in the SAS ECU 74, while those in S104 to S118 are conducted in the EPS ECU 76.

The program begins at S100 in which the output of the image processing ECU 68 is read. The image processing ECU 68 receives the image or video signal generated by the CCD camera, processes the signals and outputs the result of processing.

The program then proceeds to S102 in which the aforesaid lane holding steering assist torque is determined or calculated in the manner mentioned above. The SAS ECU 74 transfers a data bit signal indicative the steering assist torque to the EPS ECU 76, via the signal line 78, through the serial communication.

In S104, it is determined whether the transmitted steering assist torque is within a torque limit (a possible maximum value expected in the control). When the result is affirmative, the program proceeds to S106 in which it is determined that the mode of control should be a SAS (control) mode. In the SAS mode, the control is effected based on the determined steering assist torque so as to keep the vehicle on a course of travel along a lane.

When the result in S104 is negative, since this means that it is inappropriate to conduct the lane keeping torque assistance control, the program proceeds to S108 in which it is determined that the mode of control should be an EPS (control) mode, where the control is conducted based on the power steering assist torque determined in response to the detected steering torque τh to assist the driver's steering.

The program then proceeds to S110 in which it is determined whether any failure has occurred in the system. More specifically, it is determined whether the output of the torque sensor 42 is abnormal or not, whether the wire harness breaks or is disconnected (open) or not, and whether the CPU of the EPS ECU 76 is malfunctioning or not.

When the result is affirmative indicating that any failure is detected, the program proceeds to S112 in which the aforesaid PW relay 80a is turned off, to S114 in which the aforesaid F/S relay 80b is turned off to stop the electric motor 38, to S116 in which the current supply to the aforesaid FET switching devices A, B, C, D are discontinued.

On the other hand, when the result in S110 is negative indicating that no failure is detected, the program proceeds to S118 in which it is determined whether the direction in which the steering assist torque is to be applied is equal to the direction of the detected steering torque determined from the output of the torque sensor 42.

When the directions are determined to be not equal to each other, the program proceeds to S116 in which the current supply to the FET switching devices is stopped. When the directions are determined to be equal to equal to each other, the program returns to S104 to repeat the above-mentioned procedures.

Having been configured in the foregoing manner, the vehicle steering torque control system according to the invention can detect or discriminate a failure, if occurred, in the system with accuracy and take the appropriate countermeasure to cope with the failure condition.

Figure 7:
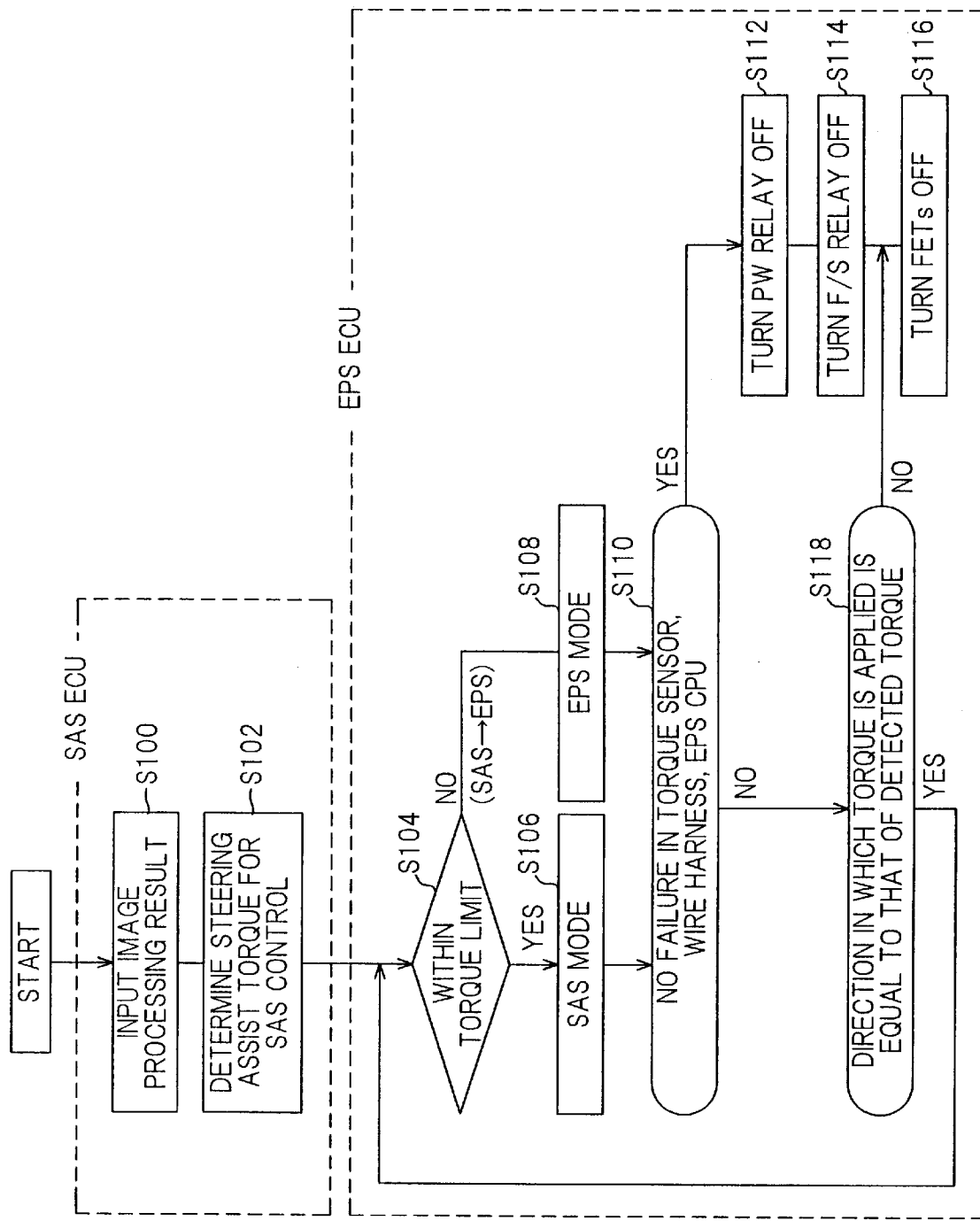
FIG. 7 is a flow chart showing the operation, more specifically failure detection of the system according to the invention illustrated in FIG. 1.
Figure 8:
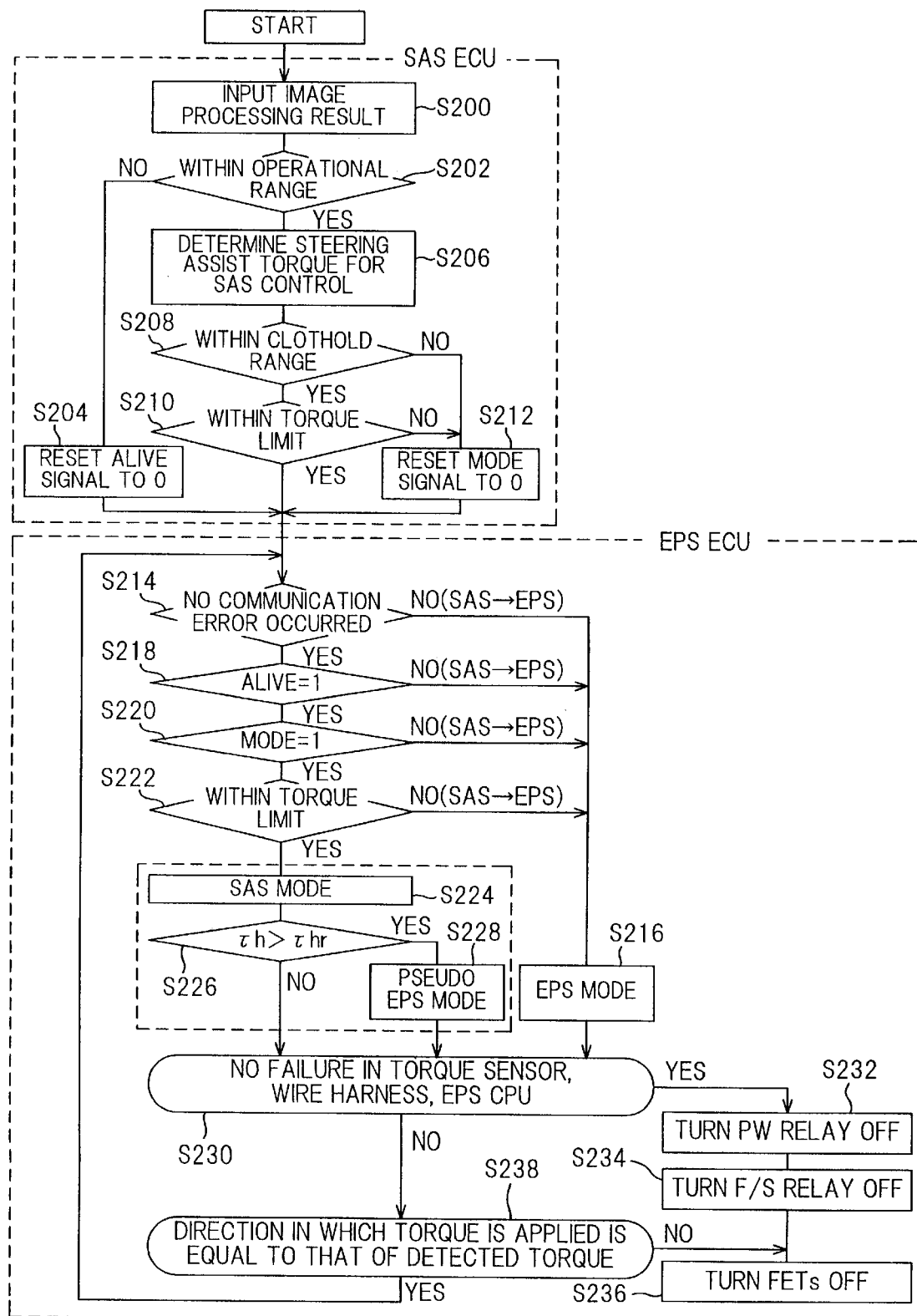
FIG. 8 is a flow chart, similar to FIG. 7, but showing the operation, more specifically failure detection of the system according to a second embodiment of the invention.

FIG. 8 is a flow chart, similar to FIG. 7, but showing the operation, i.e., failure or fault detection of the system, according to a second embodiment of the invention.

In the first embodiment mentioned above, since the failure detection or discrimination is conducted on the signal input to the EPS ECU 76, the first embodiment is unable to identify or locate failures specifically. Moreover, when the signal is significant for the system, it is desirable to detect or discriminate a failure in a repeated fashion.

The system according to the second embodiment of the invention aims to solve these problems.

In the flow chart of FIG. 8, the procedures shown in S200 to S212 are conducted by the SAS ECU 74, while those shown in S214 to S238 are conducted by the EPS ECU 76.

The program starts at S200 in which the image processing result of the image processing ECU 68 is read, and proceeds to S202 in which it is determined whether the read image is within an operative range. More specifically, it is determined whether the input data is within a range sufficient for effecting the SAS lane holding torque assistance control.

When the result is negative, since this means that the obtained information is outside of the operative range, the program proceeds to S204 in which the bit of an ALIVE signal (flag) is reset to 0. The lane holding torque assistance control is conducted in the SAS ECU 74 when the bit of the ALIVE signal is set to 1.

On the other hand, when the result in S202 is affirmative, the program proceeds to S206 in which the lane holding steering assist torque is determined or calculated based on the read image processing result, etc., in the manner mentioned above, to S208 in which it is determined whether the calculated steering assist torque is within a permissible range calculated, for example, from the clothoid curve (a moderate curve of 200R to 300R determined under the Japanese regulations on expressway construction). In other words, it is determined whether the calculated steering assist torque is within a range to be experienced in a possible expressway curve.

When the result is affirmative, the program proceeds to S210 in which it is determined whether the calculated steering assist torque is within a torque limit (a maximum possible value expected in the control). The torque limit used here varies with the vehicle speed, the curvature of the lane and the yaw rate.

When the result in S208 or S210 is negative, the program proceeds to S212 in which the bit of a MODE signal (flag) is reset to 0. The lane holding torque assistance control is effected in the SAS ECU 74 when the bit of the MODE signal is set to 1.

The SAS ECU 74 transfers a signal (data bit signal) indicative of the determined lane holding steering assist torque and the signals (ALIVE, MODE) to the EPS ECU 76 through serial communication.

In the EPS ECU 76, it is first determined in S214 whether no communication error has occurred in the transmitted signal indicative of the determined lane holding assist torque. This is done by conducting a sum check and a parity check on the data bit signal. When the result is negative, since this means that a communication error has occurred so that the transmitted signal is not reliable, the program proceeds to S216 in which it is determined that the mode of control should be the EPS mode where the power steering torque assistance control is conducted.

On the other hand, when the result in S214 is affirmative, the program proceeds to S218 in which it is determined whether the bit of the ALIVE signal is 1. When the result is negative, since this indicating that the image processing was improper, the program proceeds to S216.

When the result in S218 is affirmative, the program proceeds to S220 in which it is determined whether the bit of the MODE signal is 1. When the result is negative, since this means that the determined steering assist torque is not proper for the lane holding control, the program proceeds to S216.

When the result in S220 is affirmative, the program proceeds to S222 in which it is again determined whether the calculated steering assist torque is within another torque limit (a maximum possible value expected in the control). The torque limit used here varies with the vehicle speed. When the result is negative, the program proceeds to S216.

When the result is affirmative, the program proceeds to S224 in which it is determined that the mode of control should be the SAS mode where the lane holding steering torque assistance control is to be conducted.

The program then proceeds to S226 in which it is determined whether the detected steering torque τh exceeds a reference value τhr (e.g., 35 kgf.cm). When the result is affirmative, since this means that the driver's intention to steer by himself is estimated, the program proceeds to S228 in which it is determined that the control mode should be a pseudo EPS mode. In this pseudo EPS mode, the steering torque assistance control is conducted in the same manner as the EPS mode. The reason why the mode is named pseudo EPS is that the SAS control should normally be conducted here.

The program then proceeds to S230 in which it is determined whether any failure has occurred in the system. More specifically, it is determined whether the output of the torque sensor 42 is abnormal or not, whether the wire harness breaks or is disconnected (open) or not, and whether the CPU of the EPS ECU 76 is malfunctioning or not.

When the result is affirmative indicating that any failure is detected, the program proceeds to S232 in which the PW relay 80a is turned off, to S234 in which the F/S relay 80b is turned off to stop the electric motor 38, to S236 in which the current supply to the aforesaid FET switching devices A, B, C, D are discontinued. Accordingly, neither SAS mode control nor EPS mode control is conducted.

On the other hand, when the result in S230 is negative indicating that no failure is detected, the program proceeds to S238 in which it is determined whether the direction in which the lane holding steering assist torque is to be applied is equal to the direction of the detected steering torque determined from the output of the torque sensor 42.

When the direction is determined to be discrepant for each other, the program proceeds to S236 in which the current supply to the FET switching devices is stopped. As a result, although the steering torque assistance control is not discontinued, torque assistance is disabled since the electric motor 38 is stopped.

When the torque direction discrepancy is continually determined for a relative large number of this program loops, i.e., when the discrepancy is continued for a relatively long period, the torque assistance control itself is discontinued.

On the other hand, when the direction is determined to be equal to equal to each other in S238, the program returns to S214 to repeat the above-mentioned procedures.

The failure (fault) or exceptional conditions detected or discriminated and corresponding countermeasures to be taken thereto in the system according to the second embodiment, are briefed as follows.

(1) improper image processing (2) abnormal or improper steering assist torque in the SAS mode (3) communication error As regards failure (1)(2)(3), the mode of control is switched from the SAS mode (torque assistance control for lane keeping) to the EPS mode (control for assisting driver's steering) and the EPS mode is conducted.

(4) driver's intention to steer by himself is estimated

Although this is not a failure, but an exceptional condition, the mode of control is switched from the SAS mode to the pseudo EPS mode to assist the driver's steering.

(5) failure or abnormality in torque sensor, wire harness or EPS CPU

The relays 80a, 80b, as well as the FET switching devices are turned off to disable the steering torque assistance control.

(6) discrepancy in direction in which torque is applied

The FET switching devices are turned off to stop the motor. (As a result, the torque assistance control becomes ineffective.) If the discrepancy continues for a relatively long period, the steering torque assistance control itself is disabled.

Having been configured in the foregoing manner, the vehicle steering torque control system according to second embodiment can detect or discriminate whether a failure has occurred in the system with high accuracy and take the appropriate countermeasure to cope with the failure condition. Thus, when the system conducts fine steering assistance while preventing vehicle lane wandering, the system can to detect or discriminate a failure or fault in determining a steering assist torque necessary for a desired lane holding torque assistance control and take any countermeasure to cope with the failure condition.

Moreover, since the system is configured to detect or discriminate separate failure conditions and an exceptional condition such as the driver's intention to steer by himself, the system can take the appropriate countermeasures against the conditions detected. Furthermore, since the system is configured to conduct repeated checking on the significant information or signals such as the steering assist torque signal, the reliability of the system is enhanced.

The embodiments are thus configured to have a system for controlling steering of a vehicle, including: steering means (steering wheel 14, steering gear 24) having an actuator (electric motor 38) which steers driven wheels (front wheels 32) of the vehicle; first steering control means (EPS ECU 76) for controlling the actuator; first detecting means (CCD camera 64, image processing ECU 68) for detecting a condition of a lane on a road on which the vehicle travels; second detecting means (yaw rate sensor 82, etc.) for detecting motion of the vehicle; steering assist torque determining means (SAS ECU 74) for determining a steering assist torque necessary for holding a positional relationship between the vehicle and the lane condition; torque detecting means (torque sensor 42) for detecting a steering torque (τh) manually applied to the steering means by the driver; second steering control means (SAS ECU 74) for calculating a torque command (TA) to be output to the first steering control means (EPS ECU 76) based on the steering assist torque calculated by the steering assist torque calculating means and the detected steering torque (τh) to control the actuator such that the torque command (TA) decreases; failure detecting means (SAS ECU 74, EPS ECU 76, S104, S110, S118, S208, S210, S214, S218, S220, S222, S226, S230, S238) for detecting whether a failure has occurred at least in determination of the steering assist torque; and control discontinuing means (SAS ECU 74, EPS ECU 76, S106, S108, S112–S116, S204, S212, S216, S228, S232, S234, S236) for discontinuing the control by the second control means when the failure is detected.

The control discontinuing means switches from the control by the second control means to the control by the first control means when the failure is detected (SAS ECU 74, EPS ECU 76, S108, S204, S212, S216, S228, S232).

The failure detecting means includes: determining means (SAS ECU 74, EPS ECU 76, S104, S212) for determining whether the determined steering assist torque exceeds a torque limit; and failure discriminating means (SAS ECU 74, EPS ECU 76, S108, S212, S220, S216) for discriminating that the failure has occurred when the determined steering assist torque exceeds the torque limit. The torque limit varies with at least a vehicle speed.

The failure detecting means includes: determining means (SAS ECU 74, S208) for determining whether the determined steering assist torque exceeds a limit determined based on a permissible curvature of the lane; failure discriminating means (SAS ECU 74, EPS ECU 76, S212, S220, S216) for discriminating that the failure has occurred when the determined steering assist torque exceeds the limit determined based on the permissible curvature of the lane.

The failure detecting means includes: determining means (SAS ECU 74, S202) for determining whether an output of the first detecting means is within a operative range; and failure discriminating means (SAS ECU 74, EPS ECU 76, S204, S218, S216) for discriminating that the failure has occurred when the output of the first detecting means is not within the operative range.

The failure detecting means includes: determining means (EPS ECU 76, S214) for determining whether a communication error occurred in output of the determined steering assist torque from the second steering control means to the first control means; and failure discriminating means (EPS ECU 76, S216) for discriminating that the failure has occurred when the communication error occurred in output of the determined steering assist torque from the second steering control means to the first steering control means.

The system further includes driver's intention estimating means (EPS ECU 76, S226) for estimating the driver's intention to steer by himself; and wherein the control discontinuing means switches from the control by the second control means to the control by the first control means when the driver's intention to steer by himself is estimated (EPS ECU 76, S228).

The driver's intention estimating means includes: determining means (EPS ECU 76, S222) for determining whether the detected steering torque exceeds a reference value; and wherein the driver's intention estimating means (EPS ECU 76, S228) estimates that the driver has the intention to steer by himself when the detected steering torque exceeds the reference value.

The control discontinuing means includes: control disabling means (EPS ECU 76, S112, S114, S116, S232, S234, S236) for disabling the control by the second control means when the failure is detected in at least one of the second detecting means and the second control means.

The control disabling means disables the control by the second control means by discontinuing operation of the actuator (EPS ECU 76, S116, S236).

The control discontinuing means includes: determining means (EPS ECU 76, S238) for determining whether a direction of the determined steering assist torque is equal to that of the detected steering torque; and wherein the control discontinuing means discontinues the control by the second control means when the direction of the determined steering assist torque is equal to that of the detected steering torque (EPS ECU 76, S112, S114, S116, S232, S234, S236).

The control discontinuing means includes; control disabling means (EPS ECU 76, S112, S114, S116, S232, S234, S236) for disabling the control by the second control means when the failure is detected in at least one of the second detecting means and the second control means.

The control disabling means disables the control by the second control means by discontinuing operation of the actuator (EPS ECU 76, S116, S236).

Although an embodiment was explained in which the steering assist mechanism doubles as a conventional power steering mechanism, the two mechanisms can instead be provided independently. The steering assist mechanism can be hydraulically powered instead of being electrically powered as in the foregoing embodiment.

The steering angle sensor 44 and other sensors can be differently configured from what was described in the foregoing and their locations are limited only by the need to provide the required values.

Although the invention has thus been shown and described with reference to specific embodiments, it should be noted that the invention is in no way limited to the details of the described arrangements but changes and modifications may be made without departing from the scope of the invention which is defined by the appended claims.

What is claimed is:

1. A system for controlling steering of a vehicle, including:

steering means having an actuator which steers driven wheels of the vehicle;

first steering control means for controlling the actuator;

first detecting mean for detecting a condition of a lane on a road on which the vehicle travels;

second detecting means for detecting motion of the vehicle;

steering assist torque determining means for determining a steering assist torque necessary for holding a positional relationship between the vehicle and the lane condition;

torque detecting means for detecting a steering torque manually applied to the steering means by the driver;

second steering control means for calculating a torque command to be output to the first steering control means based on the steering assist torque calculated by the steering assist torque calculating means and the detected steering torque to control the actuator such that the torque command decreases;

failure detecting means for detecting whether a failure has occurred at least in determination of the steering assist torque; and control discontinuing means for discontinuing the control by the second control means when the failure is detected.

2. A system according to claim 1, wherein the control discontinuing means switches from the control by the second control means to the control by the first control means when the failure is detected.

3. A system according to claim 2, wherein the failure detecting means includes:

determining means for determining whether the determined steering assist torque exceeds a torque limit; and failure discriminating means for discriminating that the failure has occurred when the determined steering assist torque exceeds the torque limit.

4. A system according to claim 3, wherein the torque limit varies with at least a vehicle speed.

5. A system according to claim 2, wherein the failure detecting means includes:

determining mean for determining whether the determined steering assist torque exceeds a limit determined based on a permissible curvature of the lane;

failure discriminating means for discriminating that the failure has occurred when the determined steering assist torque exceeds the limit determined based on the permissible curvature of the lane.

6. A system according to claim 2, wherein the failure detecting means includes:

determining means for determining whether an output of the first detecting means is within a operative range; and failure discriminating means for discriminating that the failure has occurred when the output of the first detecting means is not within the operative range.

7. A system according to claim 2, wherein the failure detecting means includes:

determining means for determining whether a communication error occurred in output of the determined steering assist torque from the second steering control means to the first control means; and failure discriminating means for discriminating that the failure has occurred when the communication error occurred in output of the determined steering assist torque from the second steering control means to the first steering control means.

8. A system according to claim 2, further including:

driver's intention estimating means for estimating the driver's intention to steer by himself;

and wherein the control discontinuing means switches from the control by the second control means to the control by the first control means when the driver's intention to steer by himself is estimated.

9. A system according to claim 8, wherein the driver's intention estimating means includes:

determining means for determining whether the detected steering torque exceeds a reference value;

and wherein the driver's intention estimating means estimates that the driver has the intention to steer by himself when the detected steering torque exceeds the reference value.

10. A system according to claim 2, wherein the control discontinuing means includes;

control disabling means for disabling the control by the second control means when the failure is detected in at least one of the second detecting means and the second control means.

11. A system according to claim 10, wherein the control disabling means disables the control by the second control means by discontinuing operation of the actuator.

12. A system according to claim 1, wherein the control discontinuing means includes:

control disabling means for disabling the control by the second control means when the failure is detected in at least one of the second detecting means and the second control means.

13. A system according to claim 12, wherein the control disabling means disables the control by the second control means by discontinuing operation of the actuator.

14. A system according to claim 1, wherein the control discontinuing means includes:

determining means for determining whether a direction of the determined steering assist torque is equal to that of the detected steering torque;

and wherein the control discontinuing means discontinues the control by the second control means when the direction of the determined steering assist torque is equal to that of the detected steering torque.

15. A method of controlling steering of a vehicle, including:

steering means having an actuator which steers driven wheels of the vehicle;

first steering control means for controlling the actuator;

first detecting mean for detecting a condition of a lane on a road on which the vehicle travels;

second detecting means for detecting motion of the vehicle;

steering assist torque determining means for determining a steering assist torque necessary for holding a positional relationship between the vehicle and the lane condition;

torque detecting means for detecting a steering torque manually applied to the steering means by the driver;

second steering control means for calculating a torque command to be output to the first steering control means based on the steering assist torque calculated by the steering assist torque calculating means and the detected steering torque to control the actuator such that the torque command decreases;

wherein the method comprises the steps of:

detecting whether a failure has occurred at least in determination of the steering assist torque; and discontinuing the control by the second control means when the failure is detected.

16. A method according to claim 15, wherein switching from the control by the second control means to the control by the first control means when the failure is detected.

17. A method according to claim 16, wherein the failure detecting includes:

determining whether the determined steering assist torque exceeds a torque limit; and discriminating that the failure has occurred when the determined steering assist torque exceeds the torque limit.

18. A method according to claim 17, wherein the torque limit varies with at least a vehicle speed.

19. A method according to claim 16, wherein the failure detecting includes:

determining whether the determined steering assist torque exceeds a limit determined based on a permissible curvature of the lane;

discriminating that the failure has occurred when the determined steering assist torque exceeds the limit determined based on the permissible curvature of the lane.

20. A method according to claim 16, wherein the failure detecting includes:

determining whether an output of the first detecting means is within a operative range; and discriminating that the failure has occurred when the output of the first detecting means is not within the operative range.

21. A method according to claim 16, wherein the failure detecting includes:

determining whether a communication error occurred in output of the determined steering assist torque from the second steering control means to the first control means; and discriminating that the failure has occurred when the communication error occurred in output of the determined steering assist torque from the second steering control means to the first steering control means.

22. A method according to claim 16, further including:

estimating the driver's intention to steer by himself;

and wherein switching from the control by the second control means to the control by the first control means when the driver's intention to steer by himself is estimated.

23. A method according to claim 22, wherein the driver's intention estimating includes:

determining whether the detected steering torque exceeds a reference value;

and wherein estimating that the driver has the intention to steer by himself when the detected steering torque exceeds the reference value.

24. A method according to claim 16, wherein the control discontinuing includes;

disabling the control by the second control means when the failure is detected in at least one of the second detecting means and the second control means.

25. A method according to claim 24, wherein disabling the control by the second control means by discontinuing operation of the actuator.

26. A method according to claim 15, wherein the control discontinuing includes:

disabling the control by the second control means when the failure is detected in at least one of the second detecting means and the second control means.

27. A method according to claim 26, wherein disabling the control by the second control means by discontinuing operation of the actuator.

28. A method according to claim 15, wherein the control discontinuing includes:

determining whether a direction of the determined steering assist torque is equal to that of the detected steering torque;

and discontinues the control by the second control means when the direction of the determined steering assist torque is equal to that of the detected steering torque.

29. A computer program embodied on a computer-readable medium for controlling steering of a vehicle, including:

steering means having an actuator which steers driven wheels of the vehicle;

first steering control means for controlling the actuator;

first detecting mean for detecting a condition of a lane on a road on which the vehicle travels;

second detecting means for detecting motion of the vehicle;

steering assist torque determining means for determining a steering assist torque necessary for holding a positional relationship between the vehicle and the lane condition;

torque detecting means for detecting a steering torque manually applied to the steering means by the driver;

second steering control means for calculating a torque command to be output to the first steering control means based on the steering assist torque calculated by the steering assist torque calculating means and the detected steering torque to control the actuator such that the torque command decreases;

wherein the method comprises the steps of:

detecting whether a failure has occurred at least in determination of the steering assist torque; and discontinuing the control by the second control means when the failure is detected.

* * * * *

UNITED STATES PATENT AND TRADEMARK OFFICE
CERTIFICATE OF CORRECTION

PATENT NO. : 6,134,491
DATED : October 17, 2000
INVENTOR(S) : Hiroyuki Kawagoe, et. al.

It is certified that error appears in the above-identified patent and that said Letters Patent is hereby corrected as shown below:

Claim 1, line 6, change ``mean'' to --means--.

Claim 5, line 3, change ``mean'' to --means--.

Claim 6, line 4, change ``a'' to --an--.

Claim 15, line 6, change ``mean'' to --means--.

Claim 29, line 7, change ``mean'' to --means--.

Signed and Sealed this

Twenty-second Day of May, 2001

*Attest:*

NICHOLAS P. GODICI

*Attesting Officer*  *Acting Director of the United States Patent and Trademark Office*